United States Patent [19]

Cowan

[11] Patent Number: 4,505,750
[45] Date of Patent: Mar. 19, 1985

[54] FOUNDRY MOLD AND CORE SANDS

[75] Inventor: Jack C. Cowan, Lafayette, La.

[73] Assignee: Venture Chemicals, Inc., Lafayette, La.

[21] Appl. No.: 555,175

[22] Filed: Nov. 25, 1983

[51] Int. Cl.$^3$ ............................................. B28B 7/34
[52] U.S. Cl. ........................... 106/38.35; 106/38.51; 106/38.8; 106/38.9
[58] Field of Search .............. 106/38.5 R, 38.8, 38.9, 106/38.35

[56] References Cited

U.S. PATENT DOCUMENTS

| | | | |
|---|---|---|---|
| 1,477,064 | 12/1923 | Kleinschmidt | 106/38.2 |
| 2,686,727 | 8/1954 | Wallace | 106/38.5 R |
| 3,418,402 | 12/1968 | Grissom et al. | 106/38.8 |
| 3,958,998 | 5/1976 | Atterbury | 106/38.22 |
| 4,240,496 | 12/1980 | El Gammal | 106/38.22 |

*Primary Examiner*—Lorenzo B. Hayes
*Attorney, Agent, or Firm*—Roy F. House

[57] ABSTRACT

The addition of a hydrophobic, organophilic, water-wettable fibrous material to foundry sands increases the flowability of the sand and enables the production of molds or cores from the foundry sand which retain the sharp edges of the mold, inhibits expansion defects, and provides a cleaner pattern conformity. The hydrophobic, organophilic, water-wettable fibrous material has negligible smoke and/or fumes and does not waterproof clay binders.

The preferred hydrophobic, organophilic, water-wettable fibrous material is prepared from raw cotton from which the oils have not been removed.

22 Claims, No Drawings

FOUNDRY MOLD AND CORE SANDS

BACKGROUND OF THE INVENTION

1. Field

This invention relates to hydrophobic, organophilic water-wettable fibrous materials in foundry sands to improve the quality of the metal castings poured in molds and cores prepared therefrom. Further aspects of this invention relate to foundry sand compositions, foundry molds and cores, and the use of foundry sand additives to improve certain properties of the sand and the molds and cores prepared therefrom.

2. Prior Art

The basic refractory materials used for foundry mold and core materials are mainly silica, zircon, chromite, and olivine sands. These sands are bound together by incorporating an amount of binder to impart an optimum degree of bond strength such that the molds and cores prepared therefrom may retain their rigidity before and during casting of a metal therein. Various materials have been used as binders in foundry sands, such as clays, silicates, resins, humates, cereals, oils, furan polymers, and the like.

Although the basic ingredients of a sand mix are only sand, binder, and water, depending on the binder, other materials are often added in small amounts for special purposes. One common reason for adding such materials to sand molds is to minimize sand expansion defects. Thus buffer materials such as wood flour, fine sawdust, cereal, grain bulbs, or perlite have been added to the sand to eliminate such defects.

Sand additives are sometimes used to alter various mechanical properties of sand molds. Green strength and dry strength of a sand-clay mixture may be increased by the addition of one or more of the various cereals. Dextrin is used to increase dry strength. Hot strength is increased by silica flour, iron oxide, or ground pitch. Collapsibility is improved by cereals, or by other organic binding agents which burn out when heated to high temperatures by the molten metal in the mold.

Additions are also made to sand molds to improve the surface smoothness of castings. Carbonaceous materials such as ground pitch, sea coal, and gilsonite, have been used to obtain fine surface finishes in ferrous castings. Boric acid and sulfur are used in molds for magnesium casting to prevent metal-mold reactions. Diethylene glycol or cereal may be added to bentonite bonded sand molds to reduce their tendency to surface drying and thereby improve surface finish. Many proprietary materials are sold to the foundry industry by supply houses as mold and core additives for various purposes.

SUMMARY OF THE INVENTION

The present invention is based on the discovery that hydrophobic, organophilic, water-wettable fibrous materials, when added to foundry sands, improve the flowability of the sand, do not waterproof clay binders, and cushion the sand grains. Molds prepared from such sands provide a cleaner pattern conformity, minimize expansion defects, and have negligible smoke and/or fumes on metal casting. Castings prepared in such molds retain the sharp edges of the mold and have excellent pattern conformity.

Accordingly, it is an object of this invention to prepare foundry sands containing a hydrophobic, organophilic, water-wettable fibrous material, as hereinafter more particularly described. It is another object of this invention to prepare foundry molds or cores from foundry sands containing a hydrophobic, organophilic, water-wettable fibrous material. Still another object of this invention is to provide foundry sands and molds or cores therefrom, which contain hydrophobic, organophilic, water-wettable fibrous material in conjunction with an asphaltic material. Other objects and advantages of this invention will readily be apparent to one skilled in the art upon reading the remainder of the specification and the appended claims.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DESCRIPTION OF THE PREFERRED EMBODIMENTS OF THE INVENTION

These objects and other corollary objects and advantages of this invention are accomplished by preparing a foundry sand composition useful in the preparation of molds or cores which comprises a finely divided refractory sand, a binder, water, and a hydrophobic, organophilic, water-wettable, fibrous material (hereinafter sometimes referred to as HOWWFM). In accordance with this invention it has been surprisingly found that a foundry sand composition containing a HOWWFM as more particularly described hereinafter exhibits increased flowability and produces molds or cores which have negligible smoke and/or fumes, provide a cleaner pattern conformity, inhibit expansion defects, and which retain the sharp edges of the mold.

Any typical refractory sand such as quartz sand, zircon sand, olivine sand or other refractory material may be employed in the practice of this invention. Such sands will have a fineness in accordance with the values proposed by the American Foundryman's Society (AFS) that is in the range from about 25 to about 180. the characteristics of the sand used may in part be based on the type of metal being poured and the permeability desired in the finished mold or core. The method of determining the AFS foundry sand grade numbers and their significance is discussed in "Foundry Core Practice" by H. W. Dietert, AFS, 1952.

In the foundry sand composition of this invention, the refractory sand is present in a major proportion of at least 80%, preferably at least about 85% by weight.

Any of the known binders may be used in the foundry sand compositions of this invention.

The concentration of the binder must be sufficient to provide the desired strength properties to the foundry sand such that molds or cores prepared from the sand will not deteriorate at the elevated temperatures encountered during the pouring of metals and such that they may be handled.

The clay useful for binding the refractory sands in the practice of this invention is selected from the group consisting of smectite, kaolinite, illite, and mixtures thereof, preferably the smectite clays, most preferably bentonite clays, such as sodium bentonite, calcium bentonite, and mixtures thereof. The sodium bentonite such as the Wyoming variety is the widely used smectite clay in steel foundries. One advantage in using sodium bentonite is that optimum green and dry strengths are achieved at low clay concentrations. Calcium bentonites, such as Southern bentonite, is also a widely known foundry sand binder.

In general, a high swelling grade of sodium bentonite (i.e, Western bentonite or Wyoming bentonite) will be used in an amount ranging from about 1% to about 8% by weight of the foundry sand composition, preferably from about 2% to about 6%. Where the clay binder is a low swelling grade of calcium bentonite (i.e., Southern bentonite), there will generally be used an amount ranging from about 2% to about 8% by weight of the foundry sand composition, preferably from about 2.5% to about 7%. Illite and kaolinite clays will generally be used in an amount form about 5% to about 15% by weight.

Water must be present in the foundry sand composition to hydrate the clay binder allowing it to produce the strengths required in the molds or cores produced therefrom. The bond strength increases with increasing amount of water reaching a maximum strength at a definite degree of hydration. Thereafter, a deterioration in the bonding force occurs. For the calcium bentonites, the fall in strength occurs very sharply. The sodium bentonites can accommodate higher moisture contents and the fall in strength is more gradual. Thus the sodium bentonites are less water sensitive than the calcium bentonites. Generally the amount of water will be from about 2% to about 8% by weight, preferably from about 2.5% to about 6% by weight, of the foundry sand composition.

Alkali metal silicate, hereinafter sometimes referred to as silicate, useful in the practice of this invention may be any water-soluble alkali metal silicate, preferably a sodium silicate. Such silicates should have silica to alkali metal oxide molar ratios of a least 1:1, and preferably in the range from 2:1 to 4:1. The silicates may be used in the foundry sand composition in either solution or solid form. The preferred silicate solution has a silica to alkali metal oxide mole ratio within the range from 2:1 to 4:1, whereas the solid, water soluble silicate has a ratio within the range from 1:1 to 4:1, preferably 2:1 to 4:1. The preferred silicate solution contains from about 15% to about 55% by weight silicate. Water must be added to the foundry sand composition containing solid, water soluble silicate in order to solubilize at least a portion of the silicate. The amount of water used will generally be sufficient to provide from about 1.5% to about 6% water in the foundry sand composition upon initial mixing, preferably 2% to 6%. Water can also be added to a foundry sand composition containing silicate solution to provide from about 1.5% to about 6% water in the composition upon initial mixing, preferably 2% to 6%.

In general the amount of alkali metal silicate used in preparing the compositions of this invention will be an amount to provide from about 0.5%–5% by weight anhydrous alkali metal silicate in said compositions, preferably 0.65–4%, based on the total dry weight of the composition. The term "anhydrous alkali metal silicate" is intended to mean the combined amount of silica and alkali metal oxide in the alkali metal silicate.

The organic binders can be classified into three main groups, viz., oil-, cereal- and resin-bond. Use of oil and cereal bonds is very old, and in recent years the resins have been used very extensively in such processes as shell molding and mold and core making by the air-set and hot-box processes.

All the three types of oil, i.e., vegetable oil such as linseed oil, animal oil and mineral oil as, for example, the polymers of petroleum have found application in the steel foundry.

Oils can be categorized into the air-drying and oven-drying types. Linseed oil is the latter variety and, prior to the introduction of air-drying oils, found universal application for core production. The advantage in the use of oil is that it forms a very strong bond by oxidation and polymerization, thereby producing very strong cores with hard non-friable surfaces. The other main advantage of oil sands or any core and mold material containing organic bonds is that after casting the bonding medium volatilizes giving very good breakdown of cores and molds during knockout of castings.

The high strengths in oil sands are developed due to the presence of linoleic and linolenic acids in oils. Linseed oil is rich in linolenic acid and is the rapid drying type as opposed to linoleic acid which is slow drying.

A good test to evaluate the suitability of an oil in terms of baked strength and surface hardness of cores is to find the saponification number which is the number of milligrams of KOH necessary for the complete hydrolysis of 1 g of oil. Raw linseed oil has a saponification number of 190 and a value exceeding 130 is known to produce very satisfactory cores for steel-foundry application.

Animal oils have also been used but about 30% more oil is necessary to develop strengths comparable to vegetable oils. The basis for quick-drying oils is the mineral oils such as the petroleum polymers. Mixed oils or linseed oils containing accelerators in the form of metallic salts are manufactured as proprietary binders and find application in steel foundries.

Oils, whether vegetable, mineral or animal, have little green strength and therefore stripping of cores from core boxes becomes very difficult. Inadequate green strength also results in sagging of cores on drying plates during transportation to ovens for baking. This problem is overcome by imparting an amount of green strength to oil-bonded sands. The incorporation of sufficient quantities of the HOWWFM of this invention may impart the desired green strength sufficient for the cores to be stripped from the core boxes and to retain their shape until strength and rigidity are developed upon baking in the drying ovens.

The bonding medium in shell mold and core material is generally a resin. This is mixed with silica sand and the resulting material is dumped on a hot pattern plate or blown into a hot core box. The resin melts and as it flows an adhesive bond holds the quartz particles together. There are two broad types of resin, viz., (1) thermoplastic resin, (2) thermosetting resin. Thermoplastic resin such as natural wood rosin or synthetic resins such as polyvinyl chloride can be heated to melt and harden on cooling. The cooled solids can be reheated to remelt and this plasticity can be restored each time by repeated heating of the same cold resin. The thermosetting resins such as urea or phenol formaldehyde can be heated to flow and harden upon cooling. However, this cold resin cannot be remelted by a second cycle of heating, that is, unlike the thermoplasts the process is not reversible.

The difficulty with the thermosetting resin is that heated pattern plates and curing ovens are necessary.

Therefore large castings have not been a practical proposition and shell mold and core making have been confined mainly to small castings. The resin binders which can be hardened by simply standing in air have found very useful application in the production of large molds and cores in the steel foundry. Like the carbon dioxide process, the core boxes are rammed and hardened in situ. This means that stripping of cores and their consequent drying in stoves are eliminated resulting in a saving of labor and fuel cost. Strengths of self-curing or carbon dioxide hardened materials are comparable to conventional core sands. However, these non-stoving binders are relatively expensive.

Cores which are rammed and hardened in situ by standing in air have the core material composed of silica sand and a group of resins which form highly cross-linked polymers upon the action of acids. The resin binders are made by mixing various proportions of urea, formaldehyde and furfuryl alcohol ($C_4H_3O-CH_2OH$). A mixture such as this is used for reasons of economics and also because furfuryl alcohol alone gives a relatively weak bond. A strong acid such as phosphoric acid is used to increase the curing speed of the rammed molds or cores.

In the hot-box process sands bonded with similar types of binder as those used in the cold-curing process are employed, but a weak catalyst is added since the core material is blown into core boxes which are heated to temperatures in the range of 200°–250° C. Furfuryl alcohol is capable of polymerizing in the presence of weak acid under the action of heat from the core box. Like the cold-curing binder, the alcohol and acid form a highly cross-linked polymer and the reaction is exothermic. This exothermic reaction is useful as the heat liberated facilitates curing right through the center of the core.

Organophilic clays, such as dimethyl dihydrogenatedtallow ammonium smectites, are known bonding agents when used in conjunction with an oleaginous liquid. Because the HOWWFM of this invention is organophilic, it can be used in such foundry sands to advantageously improve the flowability and effect a decrease in the organophilic clay binder concentration.

The HOWWFM which are useful in this invention include naturally occurring fibrous materials or synthetic fibers which have been treated to render them hydrophobic and organophilic while maintaining their ability to be wet with water. Such treatments may be chemical, thermal, mechanical, or combinations thereof. The extent of surface treatments must not be such as to render the fibrous material incapable of being wetted when agitated with water.

Suitable HOWWFM and treatments thereof are disclosed in the following U.S. patents, incorporated herein by reference: U.S. Pat. Nos. 2,211,976—treated cellulose fibers; 3,464,920—organosilane treated materials; 3,536,615—carbon coated particulate materials; 3,562,153—particualte materials coated with a colloidal hydrophobic metal or metalloid oxide; 3,791,990—dried peat; and 4,240,800—dried bagasse.

Cellulose fibers may be rendered hydrophobic by incorporating therein a phenol containing at least one aliphatic or cycloaliphatic residue having at least 6 carbon atoms, and treating the fibers with an aliphatic aldehyde. The phenol and aldehyde treatments may be effected simultaneously, or their condensation product may be used directly, and the treated fibers subjected to heat treatment.

Cellulose may also be rendered hydrophobic by surface treating cellulose with a Lewis-acid type catalyst and initiating polymerization of a hydrocarbon monomer to form a surface coating of a hydrocarbon polymer on the cellulose. Thus cellulose dried to a moisture content of 3% can be cooled to −80° in nitrogen and treated with a solution of $BF_3$ in liquid nitrogen. Isobutylene or α-methylstyrene polymerize almost instantaneously upon contacting the treated cellulose.

The particle size of the HOWWFM must exhibit a wet screen analysis of at least 90% by weight passing through a 100 mesh (U.S.) screen. That is, at least 90% by weight of the HOWWFM present in a 5% by weight water suspension will pass through a 100 mesh screen.

The term "hydrophobic" as used herein indicates that the fibrous material will float when added to water. The term "organophilic" as used herein indicates that the fibrous material will preferentially sorb oil and collect in the oil phase when added to a mixture of oil and water. The term "water-wettable" as used herein indicates that the fibrous material will be wetted by water when agitated in water, as by mixing.

The most preferred HOWFFM useful for the practice of this invention is hydrophobic, organophilic, water-wettable fibrous cotton (hereinafter sometimes referred to as HOWWFC).

This HOWWC is conveniently prepared by treating raw cotton in an air dried condition, containing from about 0% to about 20% water, by weight, with a dry acidic gas such as, for example, HCl, HBr, $SO_3$, $CO_2$, and the like, preferably dry hydrochloric acid gas in an amount from about 0.3% to about 3% by weight of the cotton at a temperature in the range from about 75° F. to about 180° F. during a treatment period from about 10 minutes to about 48 hours. During this treatment the cotton linters are mechanically degraded by buffering, augering, abrading, vibrating, etc. Thereafter the HOWWC may be further mechanically degraded, if desired, by any suitable grinding means such as a hammermill. In this matter the combination of the gaseous hydrochloric acid, temperature, and mechanical action are sufficient to produce a surface modified cotton which is of extremely fine particle size. Furthermore, it is important to use raw unprocessed cotton, preferably cotton linters, which have not been treated to remove any of the waxes or oils therefrom. In this manner there is produced a micronized, surface modified cotton which is hydrophobic, organophilic, and water-wettable.

The particle size of the HOWWC must be such that at least 90% by weight of the HOWWC thereof will water wash through a 100 mesh (U.S.) screen (sieve).

Alternatively, the HOWWC can be prepared by treating raw cotton with an aqueous acid solution, preferably hydrochloric acid or sulfuric acid, most preferably sulfuric acid. In general, the concentration of acid will range from about 2% by weight of the solution to saturation, preferably from about 10% by weight to about 25% by weight of the solution. The reaction will generally be carried out at a temperature from about 75° F. to about 220° F., preferably from about 100° F. to about 150° F. The reaction time increases as the concentration of acid or the temperature decreases. The reaction time will generally range from about 1 minute to 24 hours, preferably from about 2 minutes to about 30 minutes. See for example U.S. Pat. No. 4,064,636, incorporated herein by reference for all purposes. Sulfuric acid at a concentration of 40% or more by weight, preferably at least 80% by weight, can be mixed with a foaming agent such as a non-ionic surfactant, so as to increase the volume of the sulfuric acid, preferably by at least 10 times, before contacting the raw cotton. See for example Smith U.S. Pat. No. 4,371,449, incorporated herein by reference for all purposes.

In general, the amount of HOWWFM used in preparing the compositions of this invention, and the molds or cores prepared therefrom, will be an amount ranging from about 0.25% to about 4% by weight of the foundry sand composition, preferably from about 0.5% to about 2.5%. The amount should be sufficient to improve the flowability of the foundry sand composition, and to inhibit expansion defects, provide a clean pattern conformity, and retain the sharp edges of the mold or core.

Other foundry sand additives can be included in the compositions of this invention. Additives such as silica flour, zircon flour, sea coal, cereals, wood flour, dextrin, humates, and the like may be added to enhance specific properties of the compositions which are not obtainable by the use of the binder alone. However, it is a distinct advantage of this invention that the use of the HOWWFM in foundry sands provides a means of decreasing, and indeed of eliminating, the use of many other foundry sand additives.

One supplementary foundry sand additive which is useful in providing a reducing atmosphere in the mold is an asphaltic material, preferably gilsonite. The asphaltic material may be present in the composition of this invention in an amount from about 0.1% to about 2% by weight, preferaby from about 0.15% to about 0.75%.

Preferably the asphaltic material is coated on the surface of the HOWWFM, and the HOWWFM spreads the asphaltic material throughout the foundry sand. Thus the ability of the HOWWFM in providing a smooth mold surface also provides for a reducing atmosphere at the sand mold interface. The asphaltic material is utilized in an amount ranging from about 5% to about 50%, preferably from about 10% to about 35%, based on the weight of HOWWFM. The asphaltic material may be coated onto the HOWWFM by dispersing the asphaltic material into colloidal suspension, admixing therewith the HOWWFM, preferably under high shear conditions, and separating the coated HOWWFM from the suspension.

Many methods of preparing foundry molds and cores from foundry sand compositions are known. Molds and cores can be prepared by placing the foundry sand composition in a mold box or a core box containing a pattern and ramming to achieve a uniform bulk density, thus producing a green mold or core having good strength and reproduction of pattern detail. After ramming, the mold box or core box is removed and the green mold or core used as is. Alternatively, the green mold or core can be stored before use or before removal from the box. This will increase the compressive strength of the mold or core. If desired, the mold or core can be heated to rapidly develop greater compressive strength either before or after removal from the mold or core box. Silicate bonded sands must be cured with $CO_2$ gas or other acidic material as is well known in the art.

A special type of core composition is needed in those processes wherein the core composition is pneumatically blown or transported into the core box. These core boxes may be cold, at room temperature, or heated to several hundred degrees for rapid strength development. In normal foundry terms such processes are known as core-blowing, cold box, warm box, and hot box.

A difficulty in pneumatically conveying certain foundry core compositions is due to the poor flowability of the compositions. Stickiness of such core compositions in the core box and on the underside of the blowplate in the core blowing machine also occurs preventing the production of good cores. Very few silicate bonded core sand compositions are useful for pneumatic conveying and they have a very short bench life; thus it is not possible to store the sand mix for a period of time before use. The use of the acid treated HOWWFC of this invention as disclosed herein improves the flowability of such core sand compositions.

The foundry sand composition can be prepared in any conventional manner such as by admixing the refractory sand, binder, water, if needed, HOWWFM, and, optionally, asphaltic material together in standard foundry mixing equipment until the desired green compressive strength is obtained.

In a preferred embodiment of this invention, the foundry sand composition is prepared by admixing with a refractory sand and water, a foundry sand binder comprising a mixture of smectite clay, and the HOWWFM or asphaltic material modified HOWWFM. This foundry sand binder will contain from about 65% to about 85% of the smectite clay, preferably a bentonitic clay such as sodium and/or calcium bentonite, and from about 15% to about 35%, by weight of the binder composition, of the HOWWFM or the asphaltic material modified HOWWFM.

EXAMPLES

In order to more completely describe the invention, the following nonlimiting examples are given. In these examples, the HOWWC was prepared by reacting raw, untreated, cotton linters with 1.5% by weight dry hydrochloric acid gas at a temperature in the range from about 130° F. to about 160° F. for about 10 minutes in an apparatus designed to tumble the cotton linters. Thereafter the treated cotton linters were removed from the reactor, buffed, screened, and air classified such that at least 95% by weight of the HOWWC passed through a 100 mesh sieve by wet screen analysis.

The HOWWC is hydrophobic, organophilic, and water-wettable as evidenced by the fact that it floats and is not wetted when added to water, it preferentially sorbs and collects oil from a mixture of oil and water, and that it is readily wetted when agitated in water.

EXAMPLE 1

A foundry sand was prepared by mulling together 89.7% by weight of an 100 AGF silica sand, 6% by weight Southern (calcium) bentonite, 2% by weight of HOWWC, and 2.3% by weight water. This sand was used on both automatic and jolt squeeze machines to prepare molds in which molten aluminum was poured. Excellent castings resulted. Detail and finish were very good while deep pockets were clean and smooth.

EXAMPLE 2

A foundry sand was prepared by mulling together 90.5% by weight of a 90-100 AGF silica sand, 5.5% by weight of Western (sodium) bentonite, 3.0% by weight water, and 1% by weight of HOWWC which had been surface treated with $33\frac{1}{3}$%, based on the weight of HOWWC, of gilsonite This sand was used to prepare a mold in which molten bronze was poured. The casting finish was improved and scrap due to sand problems was reduced significantly.

I claim:

1. A foundry mold or core sand composition comprising a major proportion of refractory sand, a binder, and from about 0.25% to about 4% by weight of said composition of hydrophobic, organophilic, water-wettable cotton fibers which have a particle size such that at least 90% by weight thereof will water wash through a 100 mesh screen.

2. The composition of claim 1 which additionally contains from about 0.1% to about 2% by weight of said composition of an asphaltic material.

3. The composition of claim 1 wherein said hydrophobic, organophilic, water-wettable cotton fibers are derived from raw cotton by an acid degradation process.

4. The composition of claim 3 wherein said hydrophobic, organophilic, water-wettable cotton fiber is produced by a process comprising:
 a. reacting raw cotton with a dry, acidic gas in an amount from about 0.3% to about 3% by weight of the cotton at a temperature in the range from about 75° F. to about 180° F.; and
 b. mechanically degrading the cotton.

5. The composition of claim 4 wherein said acidic gas is hydrogen chloride.

6. The composition of claim 3 wherein said hydrophobic, organophilic, water-wettable cotton fiber is produced by a process comprising reacting raw cotton with an aqueous acid solution at a temperature from about 75° F. to about 220° F. for a time sufficient to produce said particle size after mechanical degradation of said cotton.

7. The composition of claim 6 wherein said acid is sulfuric acid.

8. The composition of claim 2 wherein said asphaltic material is gilsonite.

9. The composition of claim 2 wherein said asphaltic material is coated onto said hydrophobic, organophilic, water-wettable cotton fibers prior to incorporation into said composition.

10. The composition of claim 2 wherein said hydrophobic, organophilic, water-wettable cotton fibers are derived from raw cotton by an acid degradation process.

11. The composition of claim 10 wherein said hydrophobic, organophilic, water-wettable cotton is produced by a process comprising:
 (a) reacting raw cotton with a dry, acidic gas in an amount from about 0.3% to about 3% by weight of the cotton at a temperature in the range from about 75° F. to about 180° F.; and
 (b) mechanically degrading the cotton.

12. The composition of claim 11 wherein said acidic gas is hydrogen chloride.

13. The composition of claim 10 wherein said hydrophobic, organophilic, water-wettable cotton fiber is produced by a process comprising reacting raw cotton with an aqueous acid solution at a temperature from about 75° F. to about 220° F. for a time sufficient to produce said particle size.

14. The composition of claim 13 wherein said acid is sulfuric acid.

15. A method of producing a foundry mold or core sand composition comprising mixing a refractory sand with a binder in an amount sufficient to provide the desired green compressive strength, and from about 0.25% to about 4% by weight of said composition of hydrophobic, organophilic, water-wettable cotton fibers which have a particle size such that at least 90% by weight thereof will water wash through 100 mesh screen.

16. The method of claim 15 wherein there is additionally added from about 0.1% to about 2% by weight of said composition of an asphaltic material.

17. The method of claim 15 wherein said hydrophobic, organophilic, water-wettable cotton fibers are derived from raw cotton by an acid degradation process.

18. The method of claim 17 wherein said hydrophobic, organophilic, water-wettable cotton fiber is produced by a process comprising:
 a. reacting raw cotton with a dry acidic as in an amount from about 0.3% to about 3% by weight of the cotton at a temperature in the range from about 75° F. to about 180° F.; and
 b. mechanically degrading the cotton.

19. The method of claim 18 wherein said acidic gas is hydrogen chloride.

20. The method of claim 17 wherein said hydrophobic, organophilic, water-wettable cotton fiber is produced by a process comprising reacting raw cotton with an aqueous acid solution at a temperature from about 75° F. to about 220° F. for a time sufficient to produce said particle size.

21. The method of claim 20 wherein said acid is sulfuric acid.

22. A foundry sand binder composition comprising from about 65% to 85% by weight of said composition of a clay selected from the group consisting of sodium bentonite, calcium bentonite, and mixtures thereof, and from about 15% to about 35% by weight of said composition of hydrophobic, organophilic, water-wettable cotton fibers which have been treated to be hydrophobic and organophilic having a particle size such that at least 90% by weight thereof will water wash through a 100 mesh screen.

* * * * *